United States Patent
Lohrentz et al.

(10) Patent No.: US 8,640,434 B2
(45) Date of Patent: Feb. 4, 2014

(54) REMOVABLE CORN HEADER SNOUT

(75) Inventors: Randy Lohrentz, Buhler, KS (US);
Robert A. Matousek, Milan, IL (US)

(73) Assignee: AGCO Corporation, Duluth, GA (US)

( * ) Notice: Subject to any disclaimer, the term of this patent is extended or adjusted under 35 U.S.C. 154(b) by 43 days.

(21) Appl. No.: 13/212,452

(22) Filed: Aug. 18, 2011

(65) Prior Publication Data

US 2012/0042624 A1  Feb. 23, 2012

Related U.S. Application Data

(60) Provisional application No. 61/375,196, filed on Aug. 19, 2010, provisional application No. 61/425,804, filed on Dec. 22, 2010, provisional application No. 61/425,836, filed on Dec. 22, 2010, provisional application No. 61/425,887, filed on Dec. 22, 2010, provisional application No. 61/425,907, filed on Dec. 22, 2010, provisional application No. 61/425,920, filed on Dec. 22, 2010, provisional application No. 61/425,935, filed on Dec. 22, 2010, provisional application No. 61/426,072, filed on Dec. 22, 2010, provisional application No. 61/426,119, filed on Dec. 22, 2010, provisional application No. 61/426,141, filed on Dec. 22, 2010, provisional application No. 61/426,167, filed on Dec. 22, 2010, provisional application No. 61/426,193, filed on Dec. 22, 2010, provisional application No. 61/426,213, filed on Dec. 22, 2010, provisional application No. 61/426,234, filed on Dec. 22, 2010, provisional application No. 61/426,263, filed on Dec. 22, 2010, provisional application No. 61/426,277, filed on Dec. 22, 2010, provisional application No. 61/426,300, filed on Dec. 22, 2010, provisional application No. 61/426,090, filed on Dec. 22, 2010.

(51) Int. Cl.
*A01D 45/02* (2006.01)

(52) U.S. Cl.
USPC .......................................................... 56/119

(58) Field of Classification Search
USPC ........ 56/110, 109, 314, 319, 105, 51, DIG. 9, 56/DIG. 24, DIG. 249, 119
See application file for complete search history.

(56) References Cited

U.S. PATENT DOCUMENTS

| | | | | | |
|---|---|---|---|---|---|
| 2,473,978 | A | * | 6/1949 | Van Buskirk | 56/15.9 |
| 2,572,202 | A | * | 10/1951 | Rowland | 172/258 |
| 3,387,440 | A | * | 6/1968 | Karlsson | 56/119 |
| 3,690,359 | A | * | 9/1972 | Wenzel et al. | 241/101.742 |
| 4,403,467 | A | * | 9/1983 | Baugh | 56/119 |
| 4,538,404 | A | * | 9/1985 | Heimark et al. | 56/314 |
| 5,195,309 | A | * | 3/1993 | Mossman | 56/119 |

(Continued)

*Primary Examiner* — Thomas B Will
*Assistant Examiner* — Mai Nguyen

(57) ABSTRACT

A removable divider for a row unit of an agricultural header. The divider is configured to be detachably retained by mounting portions of a frame of the row unit. The divider is retained by the mounting portions of the frame when the divider is in a first position relative the row unit for harvesting crop and is removable from the mounting portions when the divider is in a second position relative the row unit. Outward and parallel extending portions abut the frame of the row unit when the divider is in the first position but then allow the divider to be removed from the row unit when the divider is moved into the second position.

12 Claims, 13 Drawing Sheets

(56) References Cited

U.S. PATENT DOCUMENTS

| | | | |
|---|---|---|---|
| 5,787,697 A * | 8/1998 | Post | 56/119 |
| 5,865,019 A * | 2/1999 | Hurlburt et al. | 56/119 |
| 5,910,092 A * | 6/1999 | Bennett | 56/119 |
| 7,395,651 B2 * | 7/2008 | Kost et al. | 56/119 |
| 2002/0035826 A1 * | 3/2002 | Albinger et al. | 56/109 |
| 2006/0266014 A1 * | 11/2006 | Willem et al. | 56/314 |

* cited by examiner

REMOVABLE CORN HEADER SNOUT

CROSS REFERENCE TO RELATED APPLICATIONS

The present application claims the benefit of co-pending U.S. provisional application entitled "CORN HEADER", having Ser. No. 61/375,196, filed Aug. 19, 2010; of co-pending U.S. provisional application entitled "CANTILEVERED GATHERING AUGER FOR CORN HEADER", having Ser. No. 61/425,804, filed Dec. 22, 2010; of co-pending U.S. provisional application entitled "PIVOTING GATHERING AUGER FOR CORN HEADER", having Ser. No. 61/425,836, filed Dec. 22, 2010; of co-pending U.S. provisional application entitled "CROP CAPTURING MEMBER FOR CORN HEADER WITH GATHERING AUGER", having Ser. No. 61/425,887, filed Dec. 22, 2010; of co-pending U.S. provisional application entitled "GATHERING AUGER WITH INDEPENDENT SPEED", having Ser. No. 61/425,907, filed Dec. 22, 2010; of co-pending U.S. provisional application entitled "COMBINATION DRIVEN AND IDLER SNAP ROLLS FOR CORN HEADER", having Ser. No. 61/425,920, filed Dec. 22, 2010; of co-pending U.S. provisional application entitled "SPRING LOADED SNAP ROLL FOR CORN HEADER", having Ser. No. 61/425,935, filed Dec. 22, 2010; of co-pending U.S. provisional application entitled "HELICAL ACTING SNAP ROLL FLUTES FOR CORN HEADER", having Ser. No. 61/426,072, filed Dec. 22, 2010; of co-pending U.S. provisional application entitled "REMOVABLE CORN HEADER SNOUT", having Ser. No. 61/426,119, filed Dec. 22, 2010; of co-pending U.S. provisional application entitled "OFFSET SNAP ROLLS FOR CORN HEADER", having Ser. No. 61/426,141, filed Dec. 22, 2010; of co-pending U.S. provisional application entitled "DUAL IDLER ROLLS FOR CORN HEADER", having Ser. No. 61/426,167, filed Dec. 22, 2010; of co-pending U.S. provisional application entitled "SNAP ROLLS WITH HELICAL FLUTES FOR CORN HEADER", having Ser. No. 61/426,193, filed Dec. 22, 2010; of co-pending U.S. provisional application entitled "SMOOTH IDLER ROLL FOR CORN HEADER", having Ser. No. 61/426,213, filed Dec. 22, 2010; of co-pending U.S. provisional application entitled "OFFSET STRIPPER PLATES FOR CORN HEADER", having Ser. No. 61/426,234, filed Dec. 22, 2010; of co-pending U.S. provisional application entitled "METHOD FOR URGING CROP STALKS INTO A GATHERING AUGER FOR A CORN HEADER", having Ser. No. 61/426,263, filed Dec. 22, 2010; of co-pending U.S. provisional application entitled "HELICAL ACTING STRAIGHT SNAP ROLL FLUTES FOR CORN HEADER", having Ser. No. 61/426,277, filed Dec. 22, 2010; of co-pending U.S. provisional application entitled "TWISTED STALK CHOPPING FLUTES FOR CORN HEADER", having Ser. No. 61/426,300, filed Dec. 22, 2010; which are all incorporated herein by reference.

TECHNICAL FIELD

This invention relates to cutting and gathering stalk crops such as corn with a header coupled to an agricultural vehicle.

BACKGROUND

Agricultural harvesters such as combines are typically equipped with a harvesting header. Corn headers are specifically designed to pick corn and vary in size from two-row units to twelve-row units or more. As the harvester moves through the field, each row-unit passes between rows of corn. Corn header row units typically use gathering chains to covey crop material and ears rearward toward a cross auger. A set of driven snap rolls, which rotate based on the speed of the harvester, grabs the corn stalks and forces them downward between stripper plates. The ears of corn are snapped free of the stalk and the cross auger passes the ears to the feeder housing of the harvester. If the snap rolls are operated too fast or too slow, ears of corn may be lost or entire corn stalks may be passed to the cross auger and feeder housing.

Known row units require two gathering chains and two tensioners which are heavy, expensive and wear out easily. Furthermore, the gathering chains create a complicated drive mechanism because the axes of the drive sprockets driving the chains are at right angles to the axes of the snap rolls. Also, the gathering chains do not effectively convey a large mass of crop in conditions when material other than ears of corn, such as stalks and leaves, are severed from the ground. What is needed is a simpler and more cost effective row unit that is capable of conveying a large mass of crop.

BRIEF DESCRIPTION OF THE DRAWINGS

The accompanying drawings, which are incorporated in and constitute a part of this disclosure, illustrate various embodiments of the present invention. In the drawings:

FIG. 11 shows a close up view of the

DESCRIPTION OF EXAMPLE EMBODIMENTS

Figure 1:
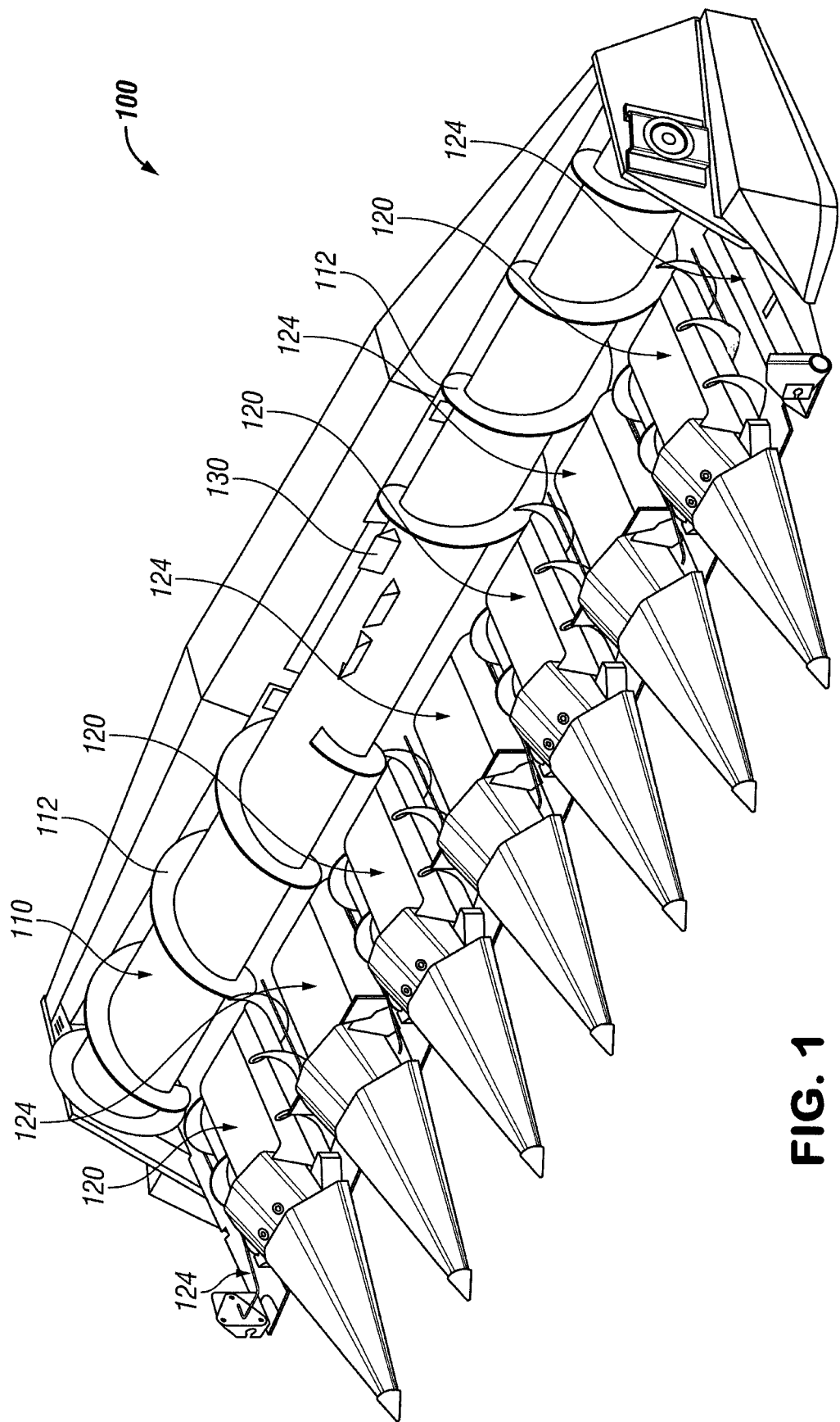
FIG. 1 shows a perspective view of a corn header having a plurality of row units for an agricultural vehicle.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "left" and "right", are made as viewed from the front looking rearward.

The exemplary header 100 selected for illustration in FIGS. 1-5 has a cross auger 110 with spiral flighting 112 for sweeping the ears of corn toward the center of the header 100. Large cross augers 110 may also have paddles 130, fingers 132 or some other means to facilitate the delivery of the crop rearward to the feeder housing of a harvester. The header 110 has a plurality of forward-extending live row-units 120 and a plurality of forward-extending dead row units 124. The row units 120, 124 and the cross auger 110 define a feeder plane therebetween where useable parts of stalk crops are conveyed rearward from the row units 120, 124 to the cross auger 110.

Figure 2:
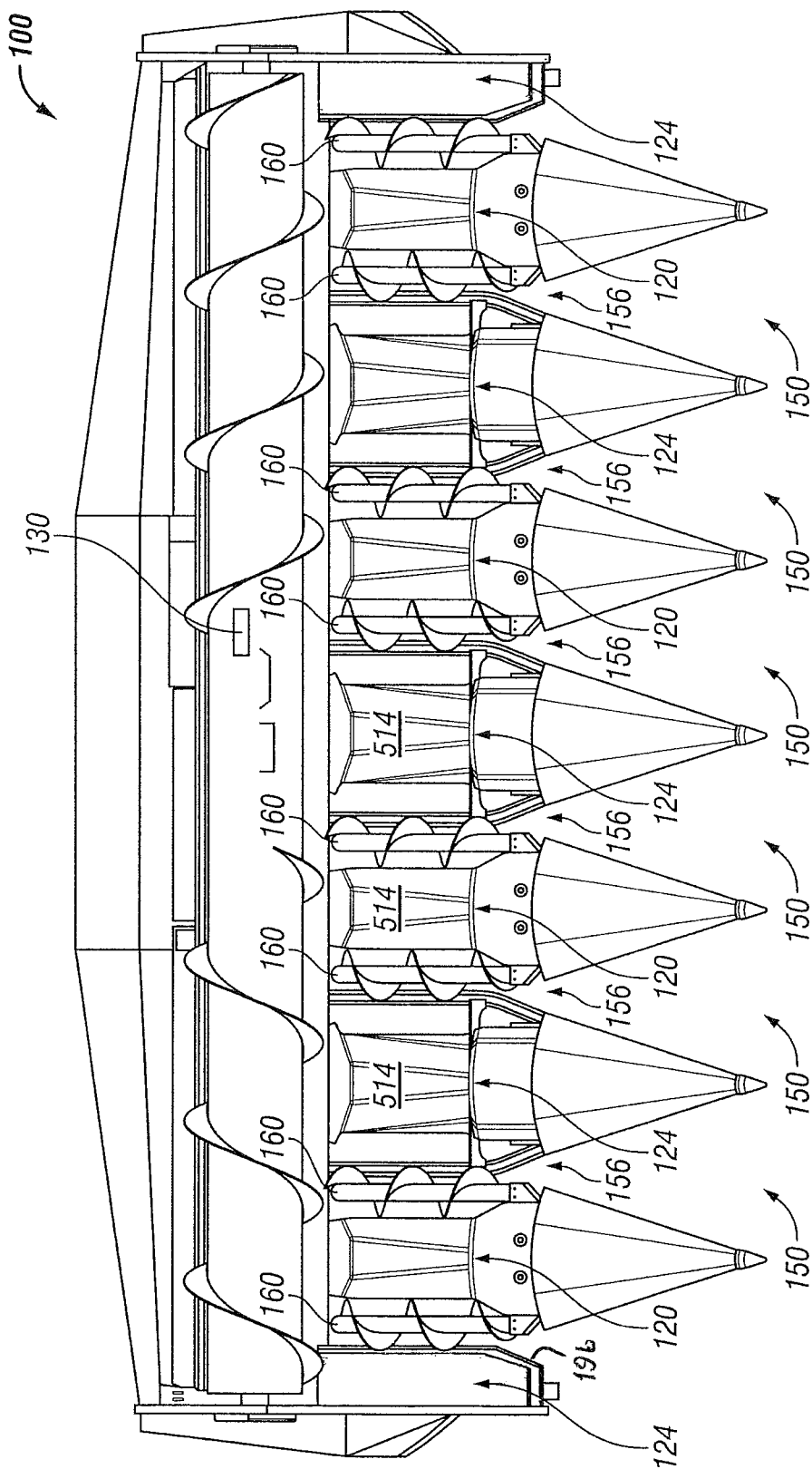
FIG. 2 shows a top view of the header of FIG. 1.
Figure 3:
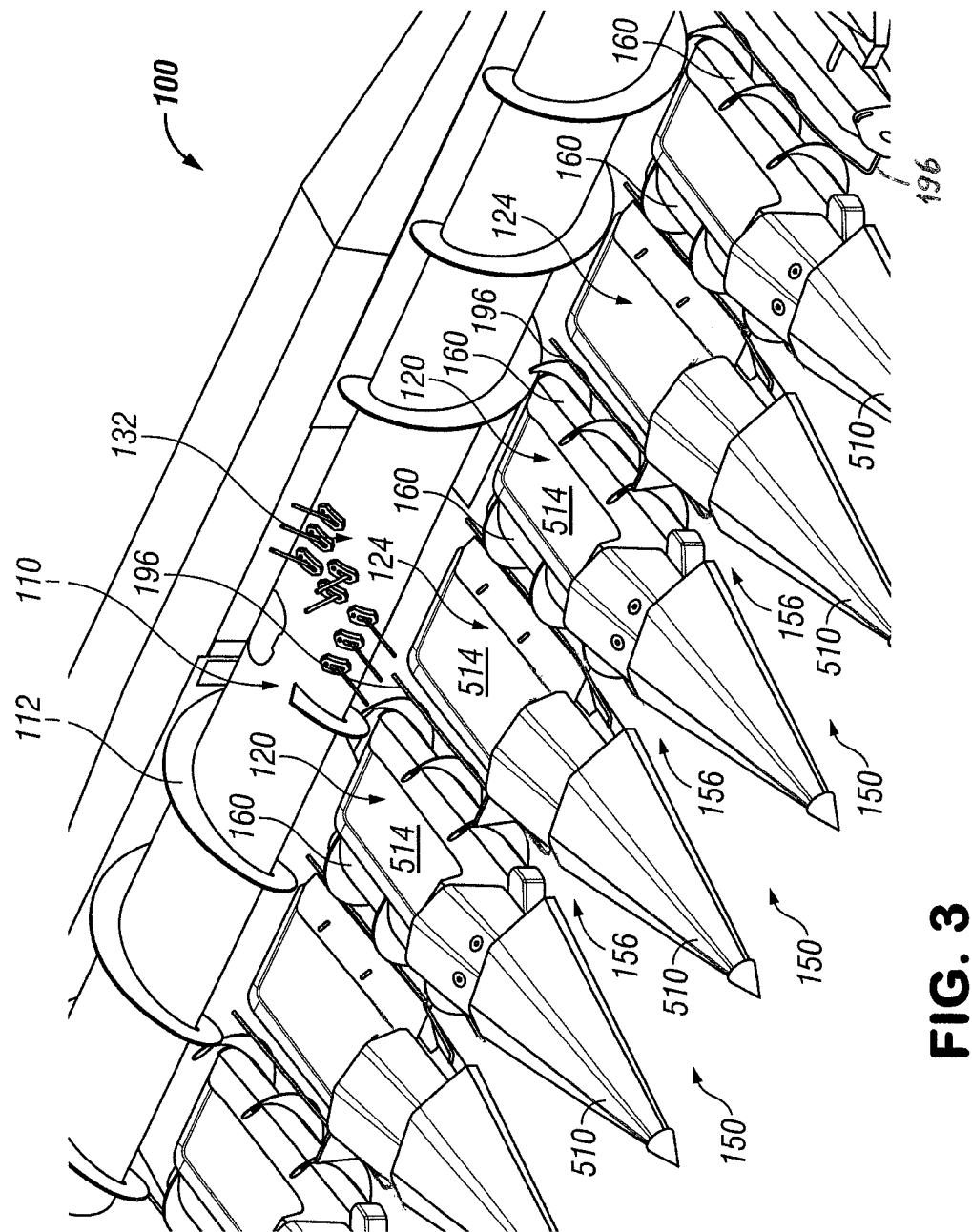
FIG. 3 shows a close-up view of a portion of the header of FIG. 1.
Figure 4:
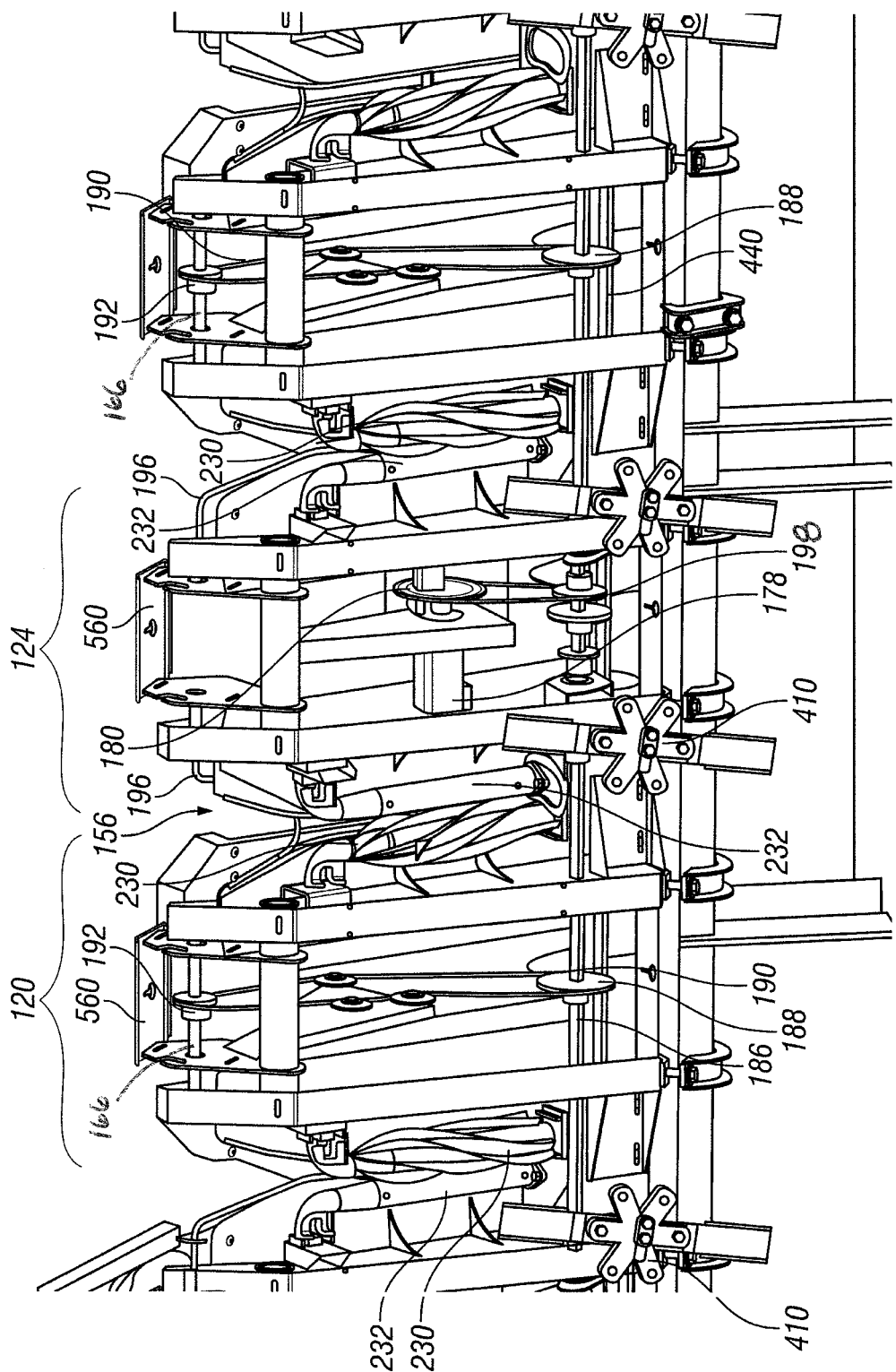
FIG. 4 shows a portion of the bottom of the header of FIG. 1.
Figure 5:
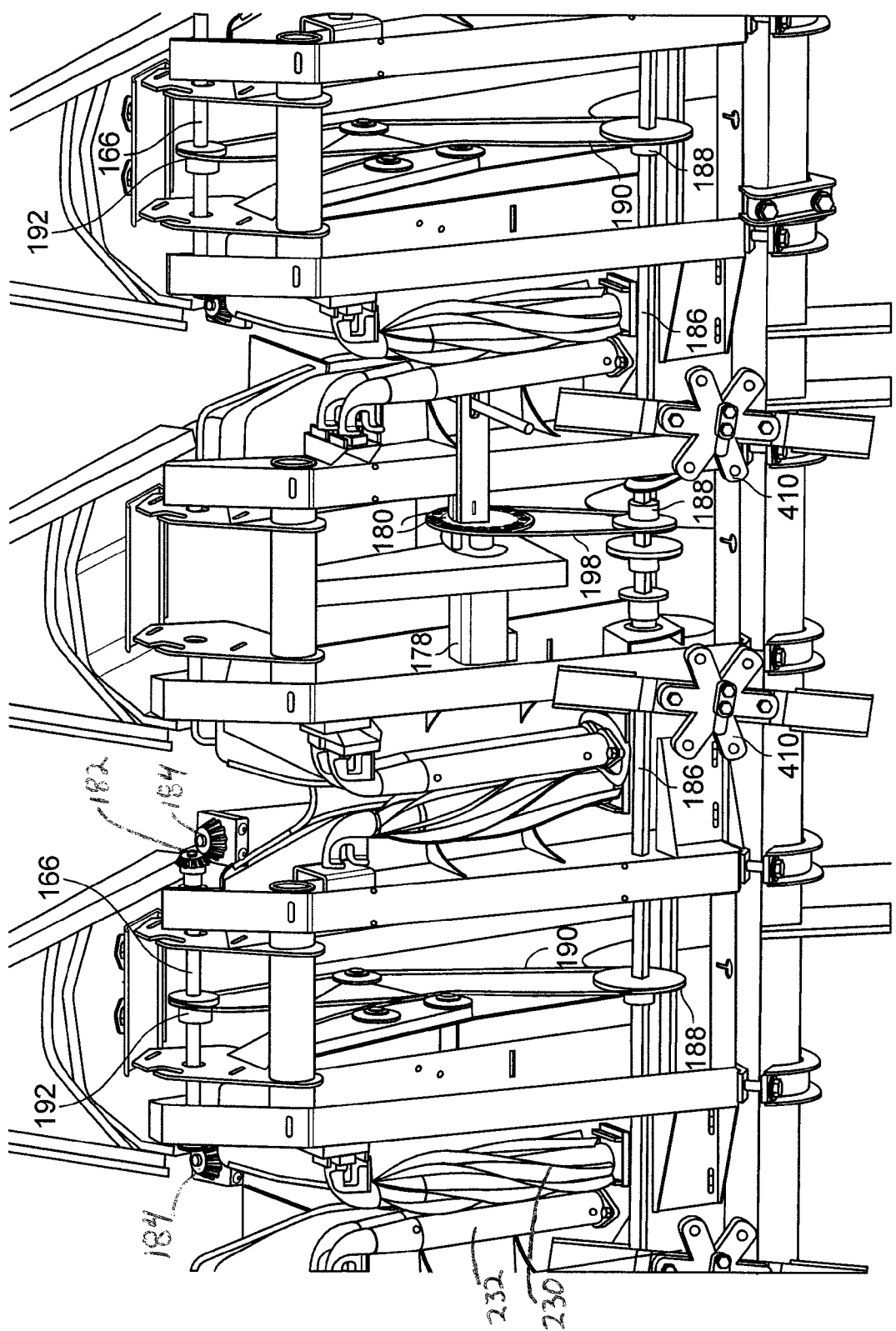
FIG. 5 shows a close-up view of a portion of the bottom of the header of FIG. 1.

Live row units 120 and dead row units 124 cooperate with one another. Live row units 120 have powered components, as described in greater detail below, whereas the dead row units 124 generally do not have powered components. In one embodiment, as best shown in FIGS. 1 and 2, the header 110 has four live row units 120, three dead row units 124, plus one half of a dead row unit 130 on each end of the header 110. The row units 120, 124 are arranged relative to one another so that the row units 120, 124 alternate relative to each other along the length of the header 110. In other words, every other row unit is a live row unit 120 with a dead row unit 124 adjacent to each live row unit 120. The row units 120, 124 are spaced relative to one another to correspond with the spacing of the crop to be harvested and to provide a path to receive the crop therebetween. For example, a live row unit 120 may be placed between two dead row units 124 to cooperate therewith.

Figure 6:
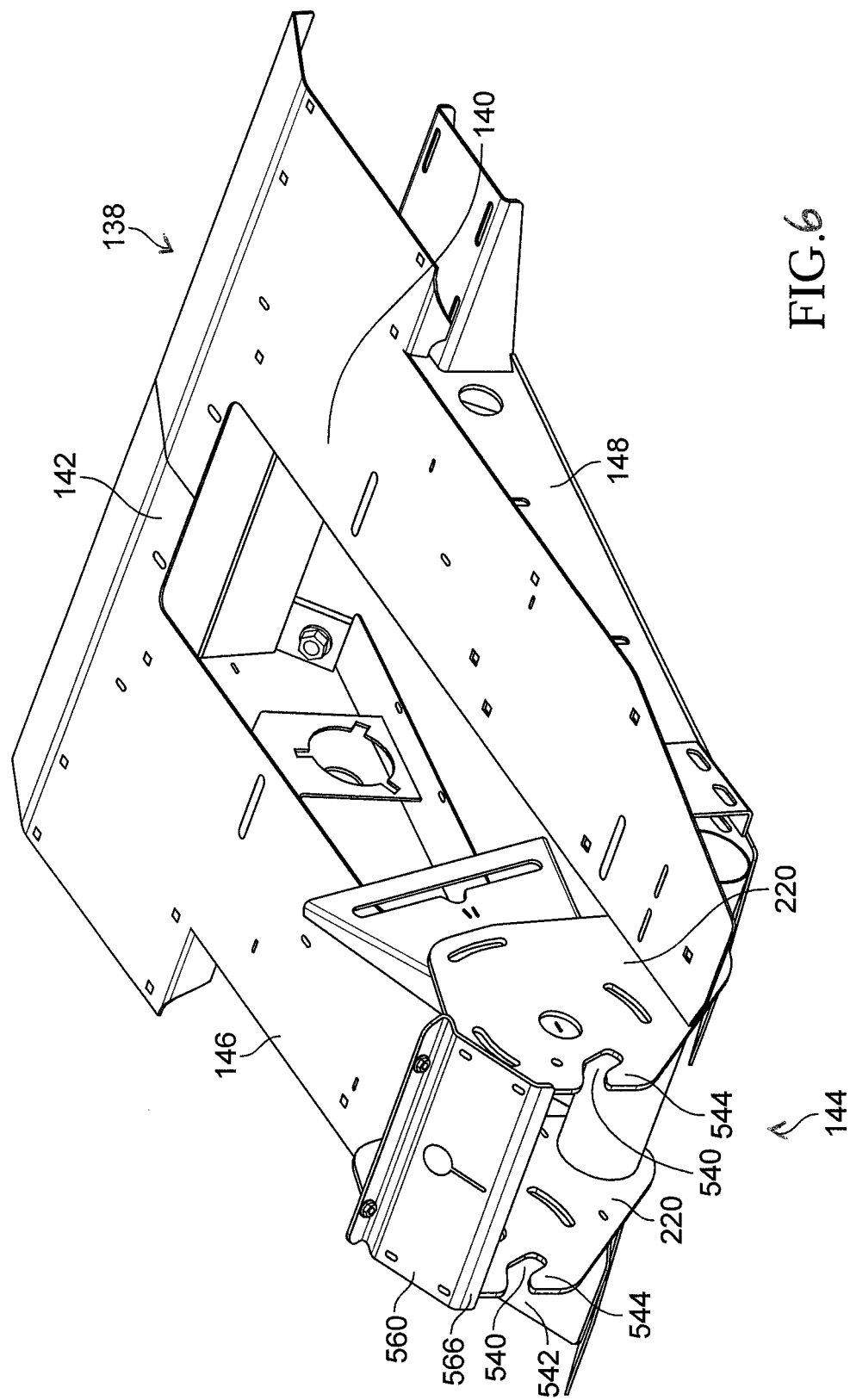
FIGS. 6 and 7 are perspective views of a frame which forms part of a live row unit and part of an adjacent dead row unit.
Figure 7:
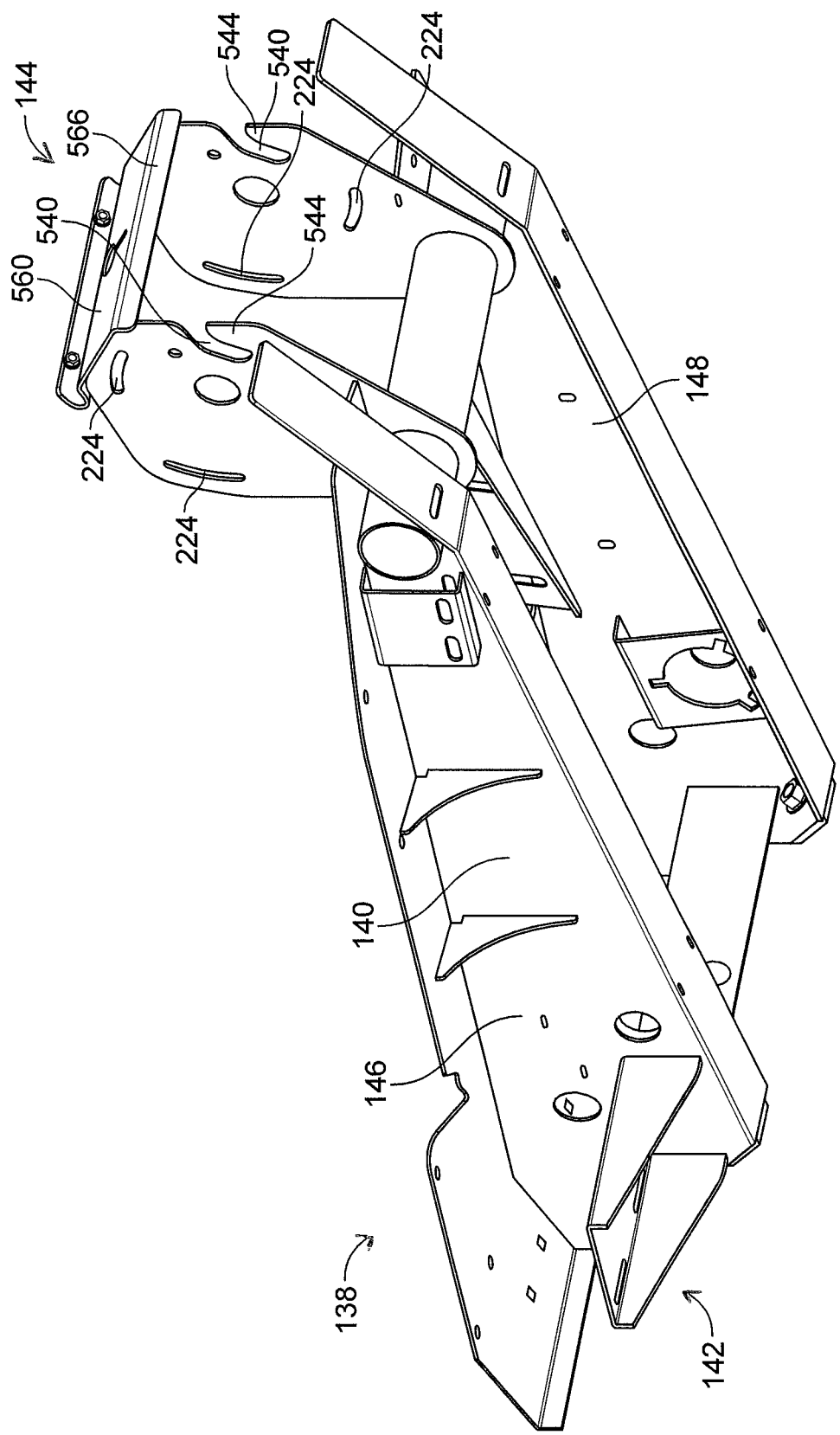

FIGS. 6 and 7 illustrate a row assembly 138 having a frame 140, a back end 142 and a forward end 144. Half of the frame 140 forms part of a live row unit 120 and the other half forms part of a dead row unit 124. Therefore, one live row unit 120 includes two halves of two separate and adjacent frames 140. One dead row unit 124 includes two halves of two separate and adjacent frames. Each frame 140 includes a first portion 146 and a second portion 148 which are spaced from one another and protrude outwardly and forward from the back end 142. At the front and between adjacent row units 120, 124 is a crop entry 150 for receiving the stalks of the crop. The first and second portions 146,148 receive stripper plates which cooperate with one another to define the crop passage 156 between adjacent row units 120, 124. The stripper plates strip useable parts such as ears of corn from crop stalks that are received in the crop passage 156.

Each live row unit 120 of the present invention includes at least one fore-to-aft gathering auger 160, in place of the two gathering chains and tensioners, for conveying the useable parts rearward to the cross auger 110. Each gathering auger 160 has a proximal end and a distal end and is preferably aligned substantially with a corresponding crop passage 156. However, the axis of rotation of the gathering auger 160 may instead be misaligned with the crop passage 156 such that the crop stalks in the back of the crop passage may be urged more so toward the gathering auger 160 than the crop stalks are at the beginning of the crop passage 156.

Preferably, each live row unit 120 includes a pair of counter-rotating augers 160. The dead row units 124, on the other hand, do not include gathering augers 160 or any gathering chains. Therefore, the complexity of the header 110 is reduced by utilizing gathering augers 160 on live row units 120 instead of gathering chains and tensioners. Also, by utilizing dead row units 124 in combination with the live row units 120 the overall complexity of the header 110 is substantially reduced because the dead row units 124 do not have gathering augers 160 or gathering chains and tensions and also because the drive means for driving the gathering augers 160 is simpler than known drives used in combination with gathering chains.

The gathering augers 160 are preferably driven independently of the snap rolls. The gathering auger 160 may be driven by electrical, mechanical or hydraulic means. Preferably, each gathering auger 160 is cantilevered from the frames 140 and rotationally driven from the forward most end of its respective row unit 120 away from the cross auger 110 rather than the rear of the row unit 120 in close proximity to the cross auger 110 so that the delivery or the distal end of the gathering auger 160 is not obstructed. This allows ears and stalks to be delivered to the cross auger 110 unimpeded by bearing supports, drive mechanisms or some other crop impeding structure.

An arrangement of gears or wheels such as bevel gears 182, 184 may be used for transmission of the driving motion to the gathering auger 160 from a driven shaft 166 within each live row unit 120 while also allowing the distal end of the gathering auger 160 to pivot upward about the same axis of the shaft 166. Each shaft 166 preferably drives a pair of gathering augers 160 of a single live row unit 120 so that the pair of gathering augers are driven about the same axis about which they may pivot into and out of the feeder plane. When the gathering auger 160 is pivoted upward, fasteners may be removed from the auger 160 so that the outer flighting portion of the gathering auger 160 may slide rearward so that it may be removed from an inner shaft and from cylindrical bearings allowing the flighting portion to rotate about the inner shaft.

The distal end of the gathering auger 160 is coupled to the bevel gear 182 which is driven by the bevel gear 184 on shaft 166. The shaft 166 may be chain driven by a hydraulic drive motor 178 with sprocket 180. Preferably, the drive motor 178 is sufficiently sized to drive all of the gathering augers 160. The drive motor 178 and sprocket 180 with chain 198 drives sprocket 188 and shaft 186 which extends in a transverse manner along the length of the header 100. There are preferably numerous other sprockets 188 along the length of the shaft 186. The number of sprockets 188 depends on the number of live row units 120. Chains 190 extend from the sprockets 188 of the shaft 186 to sprockets 192 on shaft 166.

Because the augers 160 are driven by the drive motor 178, the speed of the augers 160 is independent of the speed of the cross auger 110. The chain 190 driving the sprocket 192 which in turn drives the shaft 166 with bevel gears 182. The speed of the augers 160 can be changed automatically or manually in relation to the ground speed much like current grain headers on harvesters that control reel speed. Moreover, the augers 160 can be driven independent of the snap rolls. The speed of the gathering augers 160 may be varied while either or both the harvester and the snap rolls are maintained at a constant speed.

In addition to the apparatuses described herein, the inventions include a method for harvesting crop with an attachment for an agricultural vehicle that includes the gathering augers 160. The method includes operating the gathering augers 160 at a first speed to gather crop stalks in the crop passages 156 and operating a snap roll for removing useable parts from crop stalks at a second speed independently of the gathering augers 160. The method may also include one or more of the following steps: varying the speed of the gathering augers 160 while the speed of the snap rolls remain constant, increasing the speed of the gathering augers 160 while the speed of the snap rolls remain constant, decreasing the speed of the gathering augers 160 while the speed of the snap rolls remain constant, varying the speed of the snap rolls while the speed of the gathering augers 160 remain constant, increasing the speed of the snap rolls while the speed of the gathering augers 160 remain constant, decreasing the speed of the snap rolls while the speed of the gathering augers 160 remain constant, and/or changing the speed of the gathering augers 160 relative the ground speed of the harvester.

To keep stalks captured and engaged by the gathering auger 160 an elongated member 196 such as a rod is positioned in close proximity to the flighting of the gathering auger 160. Preferably, the elongated member 196 is substantially parallel aligned with the gathering auger 160. However, in other embodiments, at least a portion of the elongated member 196 may be shaped or curved along its length or the distal end of the elongated member 196 may be closer in proximity to the distal end of the gathering auger 160. The elongated member 196 may be rigid, flexible, or semi-flexible to urge the stalks in the crop passage toward the gathering auger 160. In one or more embodiments, the elongated member 196 is cantilevered off the forward end 144 of the frame 136 of the dead row unit 124 to urge the stalks in the crop passage 156 toward the gathering auger 160 of the opposing live row unit 120. The dead row unit may also include a second elongated member 196 extending toward another gathering auger 160 of another live row unit. In an alternative embodiment, the elongated member 196 may be a strap or be detachably coupled or mounted to a row unit.

To provide additional chopping corn headers also chop the stalks from underneath the header with mowers having one or more knives or blades much like a lawn mower. The mowers are sometimes referred to as choppers. Conventional mowers are positioned below and rearward of the snap rolls in a fixed position to chop with the blades approximately parallel to the ground and at a right angle to the stalk. In one or more embodiments of the present invention, the header 100 includes tiltable or pivotable choppers 410 where the choppers 410 are movable between multiple positions about a transverse axis to vary the angle at which crops are cut while the header may be held in a fixed position. The movement of the choppers 410 are independent of the position of the header and the row units relative to the ground.

Figure 8:
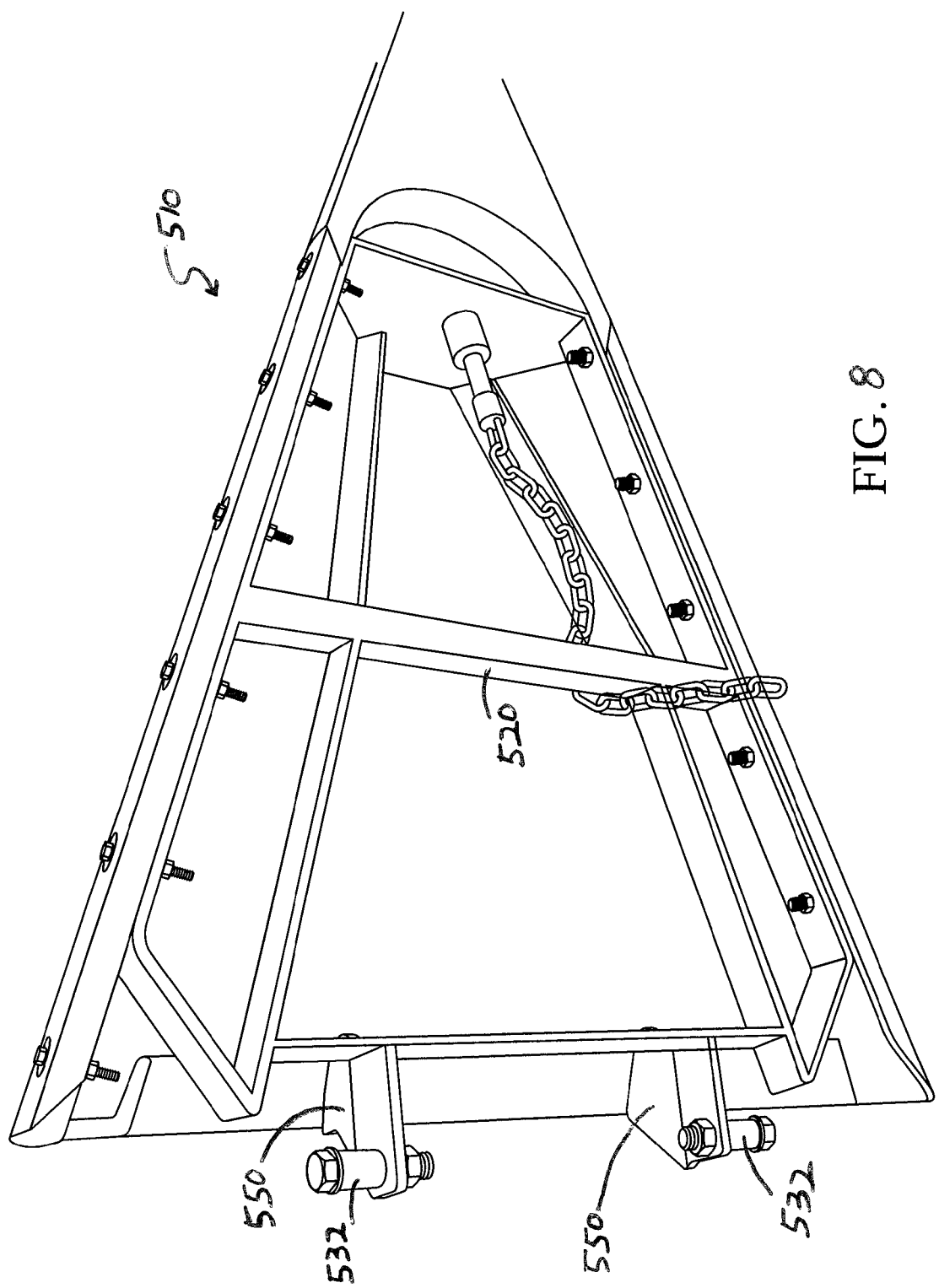
FIGS. 8 and 9 show the inner structure of a divider used in combination with row units of the present invention.
Figure 9:
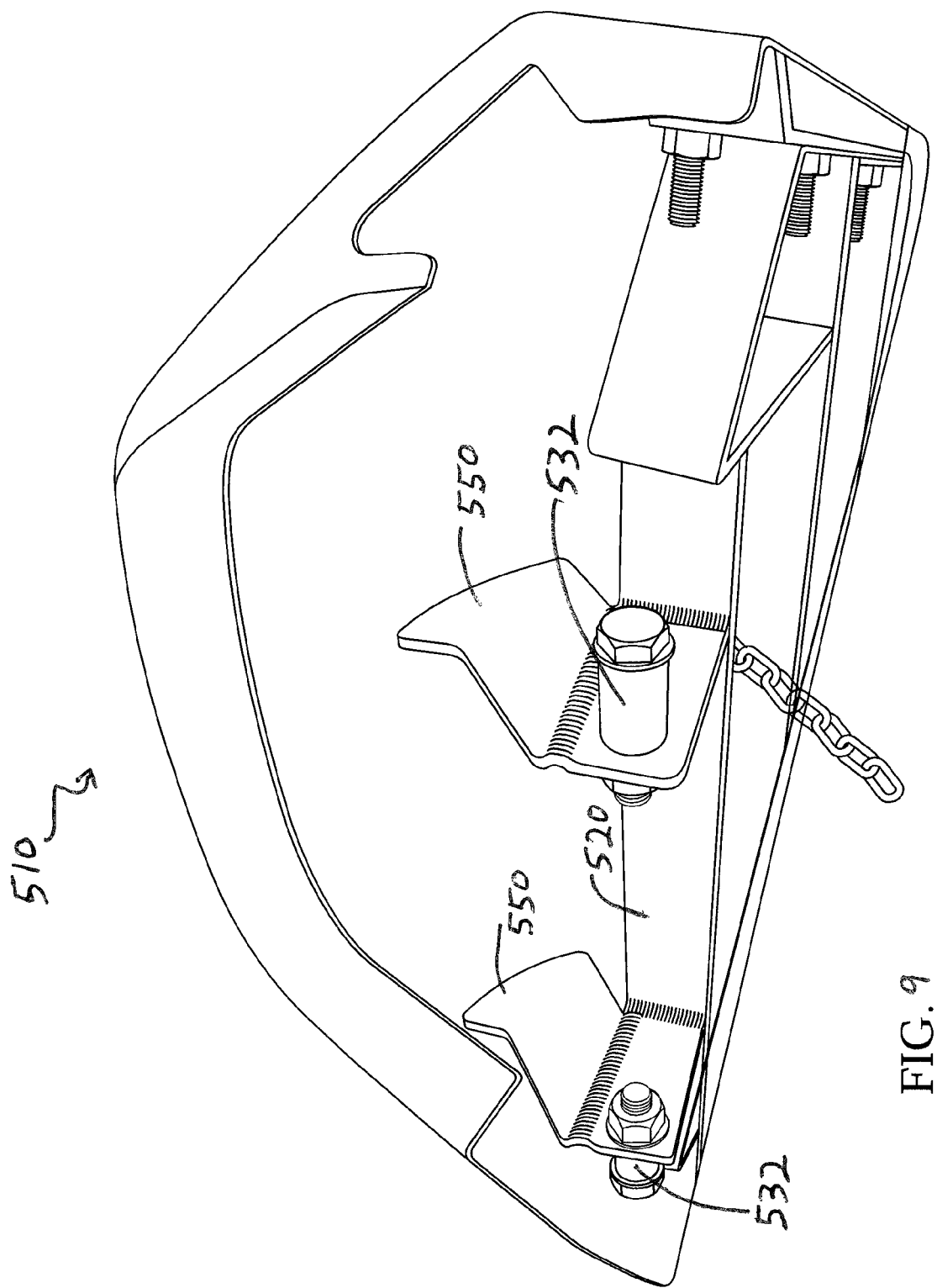
Figure 10:
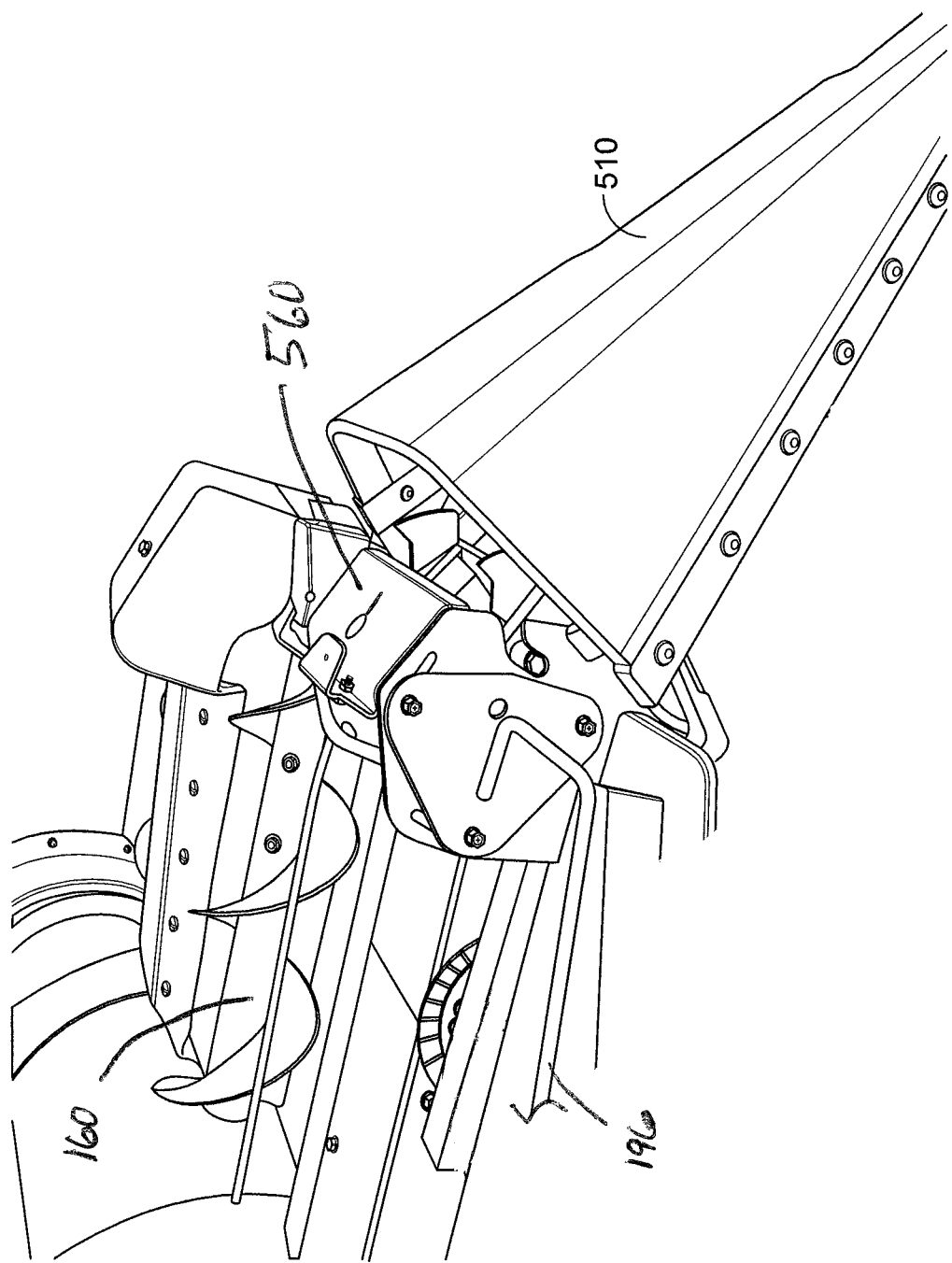
FIG. 10 shows the divider and row unit with a cover portion of the divider removed.
Figure 11:
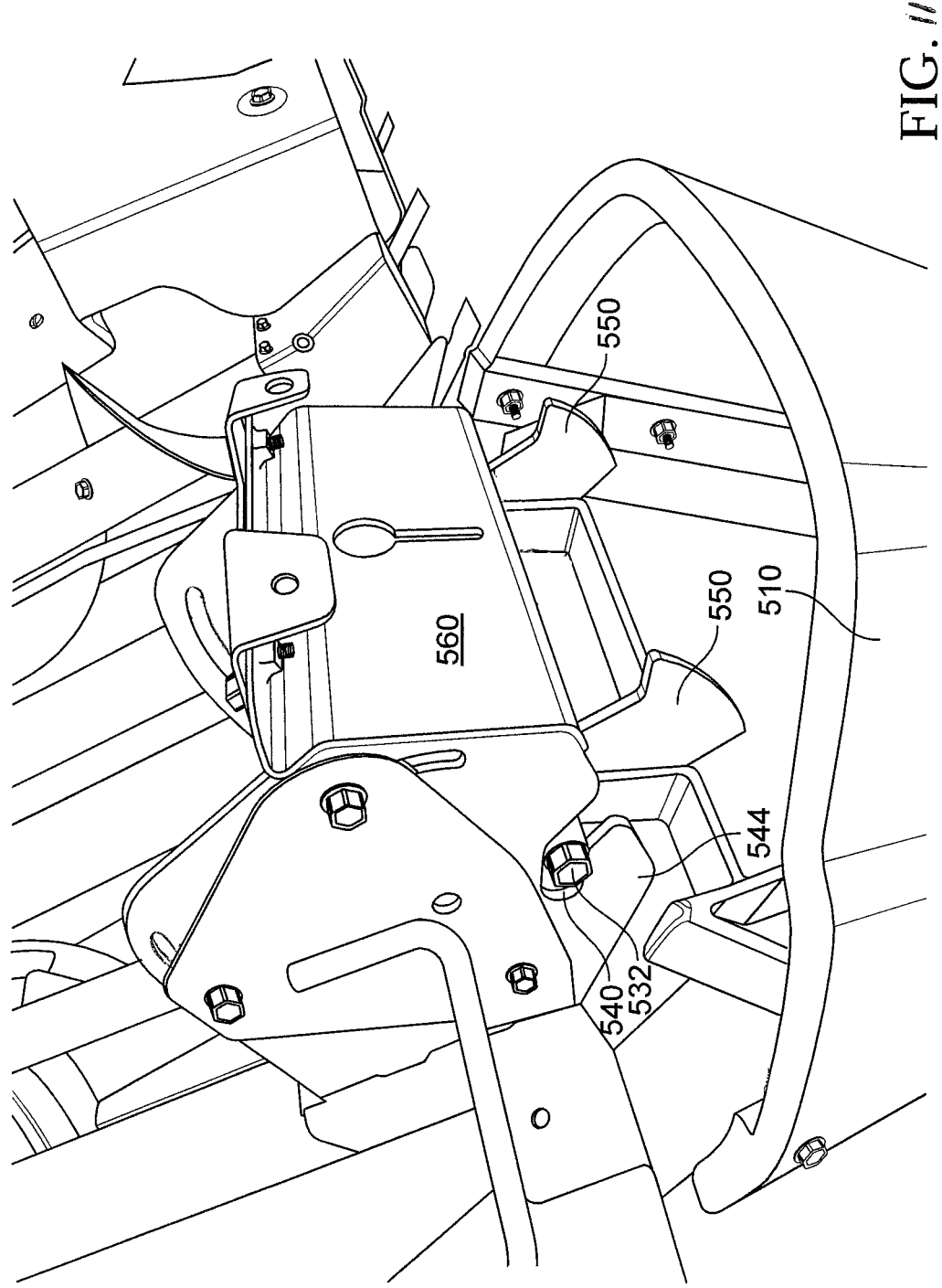

In one or more embodiments of the present invention, the row units 120, 124 may have a removable snout or divider 510 hingedly coupled to the front of each of the row units 120, 124. The row units 120, 124 also include a cover 514. Each divider 510 may include an inner structure or frame 520 as best shown in FIGS. 8 and 9. The frame 520 also includes one or more retaining portions 532 that extend outward substantially horizontally and in a transverse manner. As best shown in FIGS. 10 and 11, the retaining portions 532 may be received by open-ended arched slots 540 vertically oriented in the vertical mounting support 220 of the frame 140. This arrangement defines outwardly extending hook-shaped retaining tabs 544 that extend from the forward end 144 of each frame 140 so that the divider 510 is hingedly pivoted about a substantially horizontal pivot axis that corresponds with the retaining portions 532 in the slots 540. The retaining portions 532 slide up and down in the slots 540 while allowing the divider to pivot between positions about the pivot axis. Although described as retaining portions 532 and slots 540, the shape of the retaining portions and slots could vary son long that they allow for the detachable retention of the cover 514. For example, the retaining portions 532 may be pins that are outward and opposite extending.

Stop portions or flanges 550 protrude substantially forward from the frame 520 and substantially perpendicular and in close proximity to the pins 532 so that the distal ends of the flanges 550 abut an overhanging transversely extending edge or lip 566 of a cross support member 560 of the frame 140 when the divider 510 is up in the normal field or first position. In the example embodiment, the cross support member 560 has a fold to define the lip 566 of the forward end 144 of the frame 140 that acts as a stop against the flanges 550, thereby preventing the pins 532 from moving through the open end 542 of the arched slots 540. Flanges 550 that engage the lip 566 extend radially outward from the horizontal axis upon which the divider 510 would pivot. When the pins 532 of the divider 510 are received in the open slots 540 the pins 532 may be retained in the open slots 540 until the divider is moved into a second position where the forward most or distal end of the divider 510 is rotated downward relative the row unit to allow the pins 532 to avoid the lip 566 and cross support member 560. In this way, the pins 532 can be moved out from behind the hook-shaped retaining tabs 544 and out of the open end 542 of the slots 540.

Figure 12:
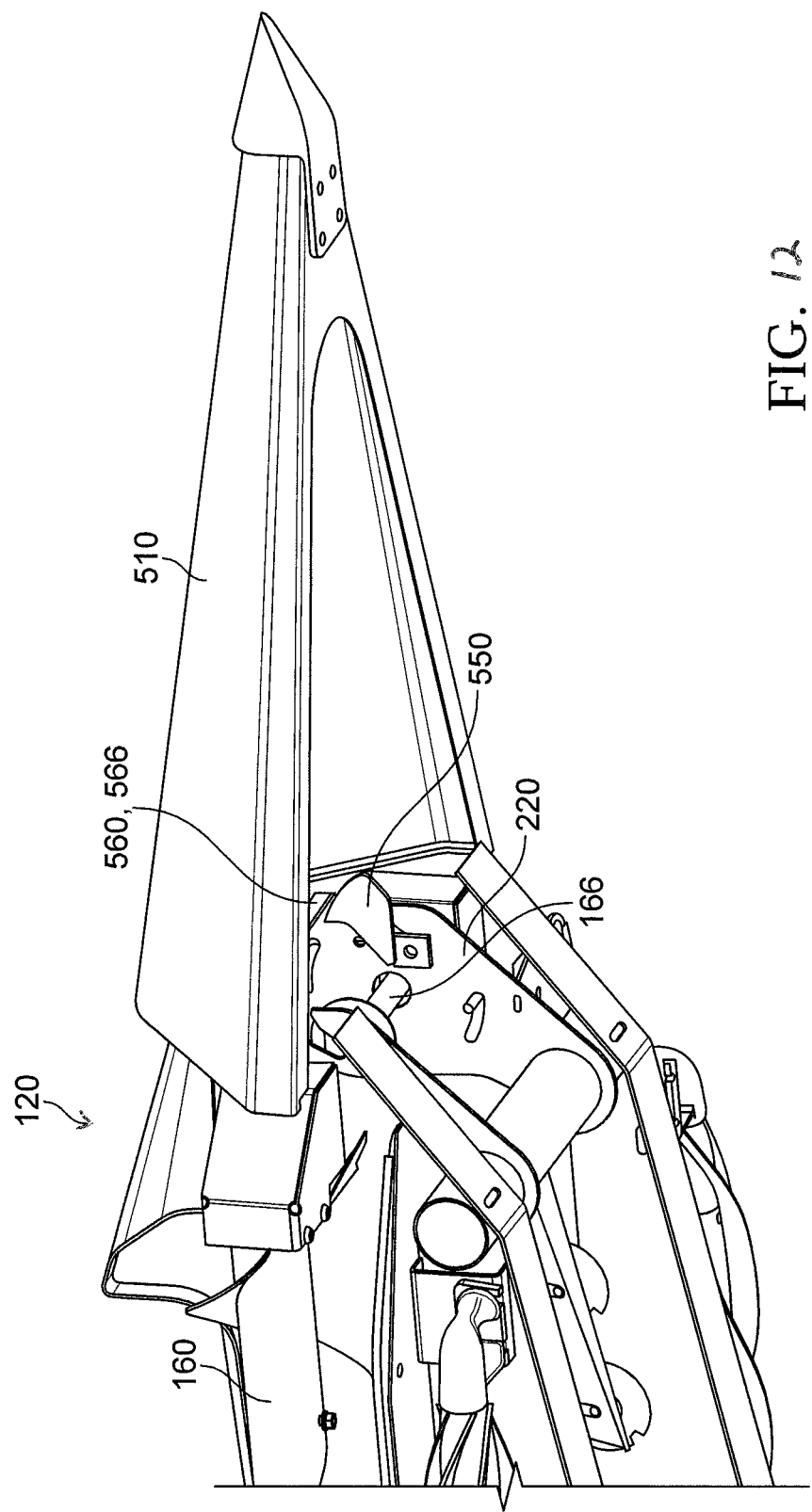
FIG. 12 shows the divider in position for corn harvesting.
Figure 13:
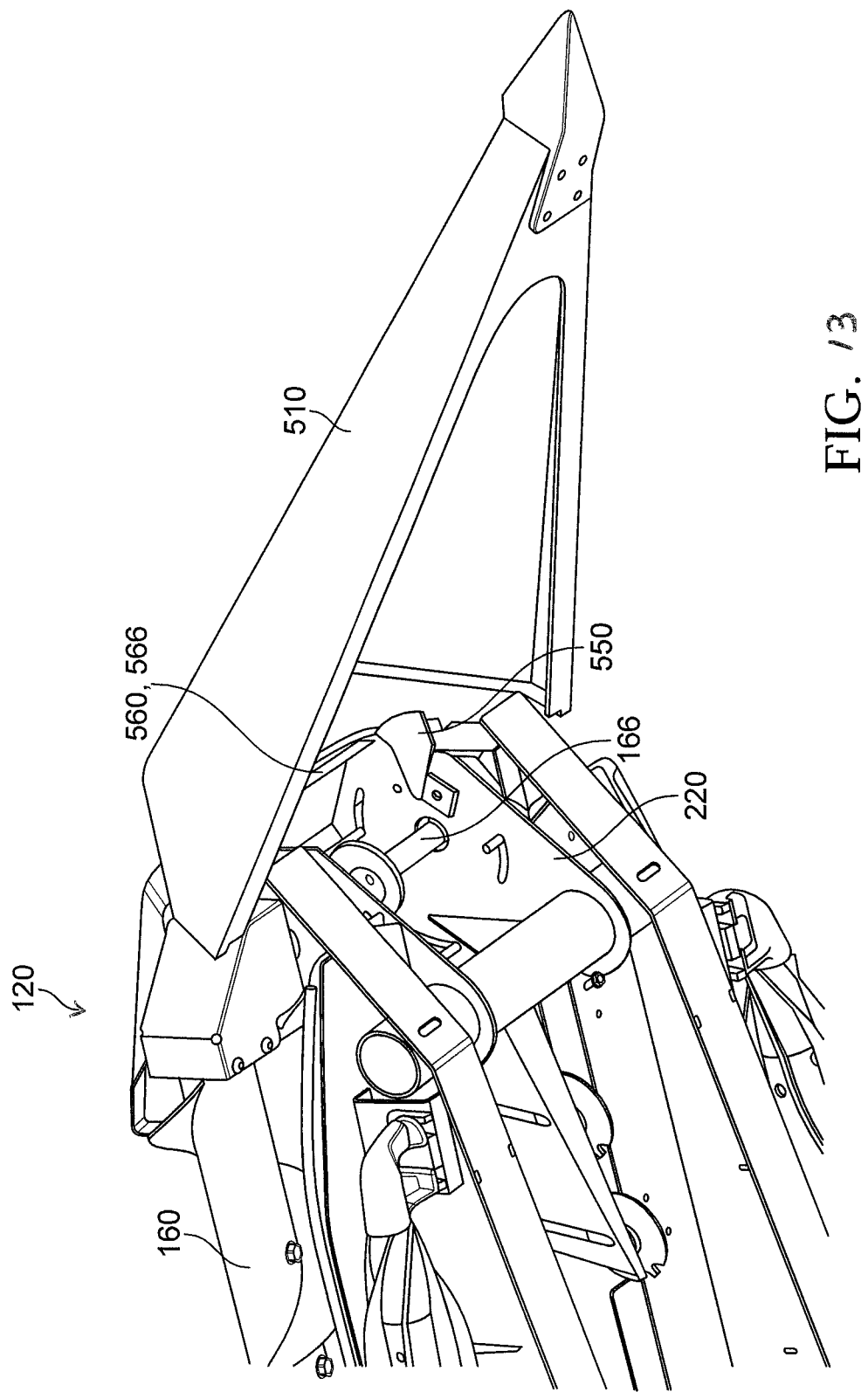
FIG. 13 shows the divider lowered into a second position which allows the divider to be removed.

A flexible member such as a rope or chain may be used to maintain the divider in the first position. FIG. 12 best shows the divider in the first position. An end of the flexible member may be coupled to the divider 510 and an opposite end may be detachable retained to the frame of the corresponding row unit to maintain the divider in the first position. An opening in the cross member 560 may be used to receive and retain the flexible member to maintain the divider in the first position. Once the flexible member is removed from the opening of the cross member 560, the divider may be moved into the second position as shown in FIG. 13 and then may be removed from the row unit.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A removable divider for a row unit of an agricultural header, said divider comprising outward and opposite extending portions configured to be detachably retained by mounting portions of a frame of said row unit, said divider retained by said mounting portions of said frame when said divider is in a first position relative said row unit for harvesting crop and said divider removable from said mounting portions when said divider is in a second position relative said row unit, said divider further comprising outward and parallel extending portions configured to abut said frame of said row unit when said divider is in said first position and to allow said divider to be removed from said row unit when said divider is in said second position, wherein said outward and parallel extending portions abut a transverse cross member of said frame of said row unit to retain said divider to said frame of said row unit when said divider is in said first position.

2. The removable divider of claim 1 wherein said mounting portions of said frame of said row unit comprise receiving slots for receiving said outward and opposite extending portions.

3. The removable divider of claim 2 wherein said slots are arched.

4. The removable divider of claim 2 wherein said slots are open-ended.

5. The removable divider of claim 4 wherein said slots at least partially define outward extending retaining tabs.

6. The removable divider of claim 5 wherein said retaining tables extend forward from said frame of said row unit.

7. The removable divider of claim 1 wherein said outward and opposite extending portions are pins.

8. The removable divider of claim 1 wherein said outward and parallel extending portions avoid said cross member of said frame of said row unit to permit said divider to be removed from said row unit when said divider is in said second position.

9. The removable divider of claim 1 wherein said cross member comprises a fold along its forward edge to define a transverse extending lip.

10. The removable divider of claim 1 wherein one end of a flexible member is coupled to said divider and an opposite end is detachably retained to said frame of said row unit to maintain said divider in said first position.

11. The removable divider of claim 10 wherein said frame comprises a cross member and said cross member defines an opening for receiving and retaining said flexible member.

12. The removable divider of claim 10 wherein said flexible member is a chain.

* * * * *